US012770242B2

(12) United States Patent
Iijima et al.

(10) Patent No.: US 12,770,242 B2
(45) Date of Patent: Oct. 20, 2026

(54) SEMICONDUCTOR IMAGE PROCESSING APPARATUS AND SEMICONDUCTOR IMAGE PROCESSING METHOD

(71) Applicant: Kioxia Corporation, Tokyo (JP)

(72) Inventors: Shuhei Iijima, Yokohama (JP); Osamu Yamane, Ebina (JP); Youyang Ng, Kamakura (JP); Yuchieh Lin, Yokohama (JP); Takuji Ohashi, Yokohama (JP); Takeshi Fujiwara, Yokohama (JP)

(73) Assignee: Kioxia Corporation, Tokyo (JP)

( * ) Notice: Subject to any disclaimer, the term of this patent is extended or adjusted under 35 U.S.C. 154(b) by 280 days.

(21) Appl. No.: 18/589,658

(22) Filed: Feb. 28, 2024

(65) Prior Publication Data

US 2024/0311997 A1 Sep. 19, 2024

(30) Foreign Application Priority Data

Mar. 16, 2023 (JP) ................................ 2023-042309

(51) Int. Cl.
*G06T 7/00* (2017.01)
*G06T 5/50* (2006.01)
(Continued)

(52) U.S. Cl.
CPC .............. *G06T 7/0008* (2013.01); *G06T 5/50* (2013.01); *G06T 7/194* (2017.01); *G06V 10/44* (2022.01);
(Continued)

(58) Field of Classification Search
CPC ......... G06T 7/0008; G06T 7/194; G06T 5/50; G06T 2207/2022; G06T 2207/30148;
(Continued)

(56) References Cited

U.S. PATENT DOCUMENTS 8,270,732 B2 9/2012 Cobb et al.
9,311,697 B2 * 4/2016 Harada ................ G06T 7/0004
(Continued)

FOREIGN PATENT DOCUMENTS

JP 5444092 B2 3/2014
JP 6792842 B2 12/2020
(Continued)

OTHER PUBLICATIONS

H. Kahng and S. B. Kim, "Self-Supervised Representation Learning for Wafer Bin Map Defect Pattern Classification," in IEEE Transactions on Semiconductor Manufacturing, vol. 34, No. 1, pp. 74-86, Feb. 2021, doi: 10.1109/TSM.2020.3038165 (Year: 2021).*
(Continued)

*Primary Examiner* — Vu Le
*Assistant Examiner* — Jack Peter Kraynak
(74) *Attorney, Agent, or Firm* — Oblon, McClelland, Maier & Neustadt, L.L.P.

(57) ABSTRACT

A semiconductor image processing apparatus including a processing circuitry, the processing circuitry configured to identify a label corresponding to a feature amount included in an input image by using an identifier, learn a model for inferring the feature amount included in the input image and learns the identifier, and perform additional learning of the model based on the input image and the learned identifier.

20 Claims, 15 Drawing Sheets

(51) Int. Cl.

| | |
|---|---|
| ***G06T 7/194*** | (2017.01) |
| ***G06V 10/44*** | (2022.01) |
| ***G06V 10/764*** | (2022.01) |
| ***G06V 20/70*** | (2022.01) |

(52) U.S. Cl.

CPC ............ *G06V 10/764* (2022.01); *G06V 20/70* (2022.01); *G06T 2207/20224* (2013.01); *G06T 2207/30148* (2013.01)

(58) Field of Classification Search

CPC ............. G06T 7/001; G06T 2207/3014; G06T 2207/20081; G06T 2207/20084; G06V 20/70; G06V 10/44; G06V 10/764; G06V 10/765

See application file for complete search history.

(56) References Cited

U.S. PATENT DOCUMENTS

| | | | | |
|---|---|---|---|---|
| 10,282,622 | B2 | 5/2019 | Togashi et al. | |
| 11,062,458 | B2 * | 7/2021 | Yokoyama | G06V 10/774 |
| 11,715,189 | B2 | 8/2023 | Nakajima et al. | |
| 11,776,108 | B2 * | 10/2023 | Wallingford | G06T 7/0006 382/149 |
| 2013/0111414 | A1 * | 5/2013 | Ho | G06V 40/28 715/863 |
| 2019/0139210 | A1 * | 5/2019 | Kondo | G06T 7/001 |
| 2020/0334800 | A1 * | 10/2020 | Chou | H10P 74/203 |
| 2021/0056675 | A1 * | 2/2021 | Higa | G06V 30/19147 |
| 2021/0150699 | A1 * | 5/2021 | Kappeler | G01N 15/1434 |
| 2021/0358115 | A1 * | 11/2021 | Hever | G06N 3/088 |
| 2022/0044391 | A1 * | 2/2022 | Wallingford | G06N 3/045 |
| 2022/0164630 | A1 | 5/2022 | Hou et al. | |
| 2022/0343479 | A1 * | 10/2022 | Chang | G06T 7/001 |
| 2023/0052350 | A1 * | 2/2023 | Harada | G06T 7/001 |
| 2023/0108419 | A1 * | 4/2023 | Mori | G06V 20/52 382/155 |
| 2023/0162388 | A1 * | 5/2023 | Sakai | G06T 7/68 382/155 |
| 2023/0196117 | A1 * | 6/2023 | Du | G06F 18/214 382/155 |
| 2023/0267599 | A1 * | 8/2023 | Qu | G06V 10/993 |
| 2024/0078659 | A1 * | 3/2024 | Ofir | G06T 7/001 |
| 2024/0273374 | A1 * | 8/2024 | Lee | G06N 3/045 |
| 2024/0370735 | A1 * | 11/2024 | Ohkawa | G06N 3/094 |
| 2025/0384647 | A1 * | 12/2025 | Mustikovela | G06V 10/242 |

FOREIGN PATENT DOCUMENTS

| | | | |
|---|---|---|---|
| JP | 2022-76296 | A | 5/2022 |
| JP | 7316867 | B2 | 7/2023 |

OTHER PUBLICATIONS

Yu, J., & Lu, X. (2016). Wafer Map Defect Detection and Recognition Using Joint Local and Nonlocal Linear Discriminant Analysis. IEEE Transactions on Semiconductor Manufacturing, 29, 33-43. (Year: 2016).*

T. Nakazawa and D. V. Kulkarni, "Anomaly Detection and Segmentation for Wafer Defect Patterns Using Deep Convolutional Encoder-Decoder Neural Network Architectures in Semiconductor Manufacturing," in IEEE Transactions on Semiconductor Manufacturing, vol. 32, No. 2, pp. 250-256, May 2019 (Year: 2019).*

* cited by examiner

| PATTERN | LENGTH | COLOR | POSITION | |
|---|---|---|---|---|
| VERTICAL LINE | WIDTH OF IMAGE | WHITE | 24 | = Da  |
| HORIZONTAL LINE | WIDTH OF IMAGE | BLACK | 120 | |
| ⋮ | ⋮ | ⋮ | ⋮ | |
| CIRCULAR SHAPE | 20 | BLACK | 32 | |
| VERTICAL LINE | WIDTH OF IMAGE | WHITE | 24 | = Db  |
| ELLIPSE | 40 | GRAY | 42 | |
| ⋮ | ⋮ | ⋮ | ⋮ | |
| CIRCLE | 5 | BLACK | 60 | |

RANDOMLY SELECT INSIDE OF BLACK FRAME

SEMICONDUCTOR IMAGE PROCESSING APPARATUS AND SEMICONDUCTOR IMAGE PROCESSING METHOD

CROSS REFERENCE TO RELATED APPLICATIONS

This application is based upon and claims the benefit of priority from the prior Japanese Patent Application No. 2023-042309, filed on Mar. 16, 2023, the entire contents of which are incorporated herein by reference.

FIELD

An embodiment of the present invention relates to a semiconductor image processing apparatus and a semiconductor image processing method.

BACKGROUND

Recent semiconductor devices have been miniaturized, and it is not easy to accurately extract defects and the like of individual semiconductor devices formed on wafers. In particular, a diffraction pattern caused by the periodic structure of the wafer may appear in an image obtained by capturing the surface of the wafer, and it is not easy to identify the diffraction pattern and the linear defect.

Recent semiconductor devices are formed through multiple fabrication processes. Therefore, there are various types of defects, and the shape, size, number, color, luminance, or the like varies for each type of defect in the image obtained by capturing the surface of the wafer. It is essential to accurately extract the defects from the image in order to improve the yield of the semiconductor device.

DETAILED DESCRIPTION

According to one embodiment, a semiconductor image processing apparatus comprising a processing circuitry, the processing circuitry configured to:

identify a label corresponding to a feature amount included in an input image by using an identifier;

learn a model for inferring the feature amount included in the input image and learns the identifier; and perform additional learning of the model based on the input image and the learned identifier.

Hereinafter, embodiments of a semiconductor image processing apparatus and a semiconductor image processing method will be described with reference to the drawings. Although main components of the semiconductor image processing apparatus will be mainly described below, the semiconductor image processing apparatus and the semiconductor image processing method may include components and functions that are not illustrated or described. The following description does not exclude components and functions that are not illustrated or described.

First Embodiment

Figure 1:
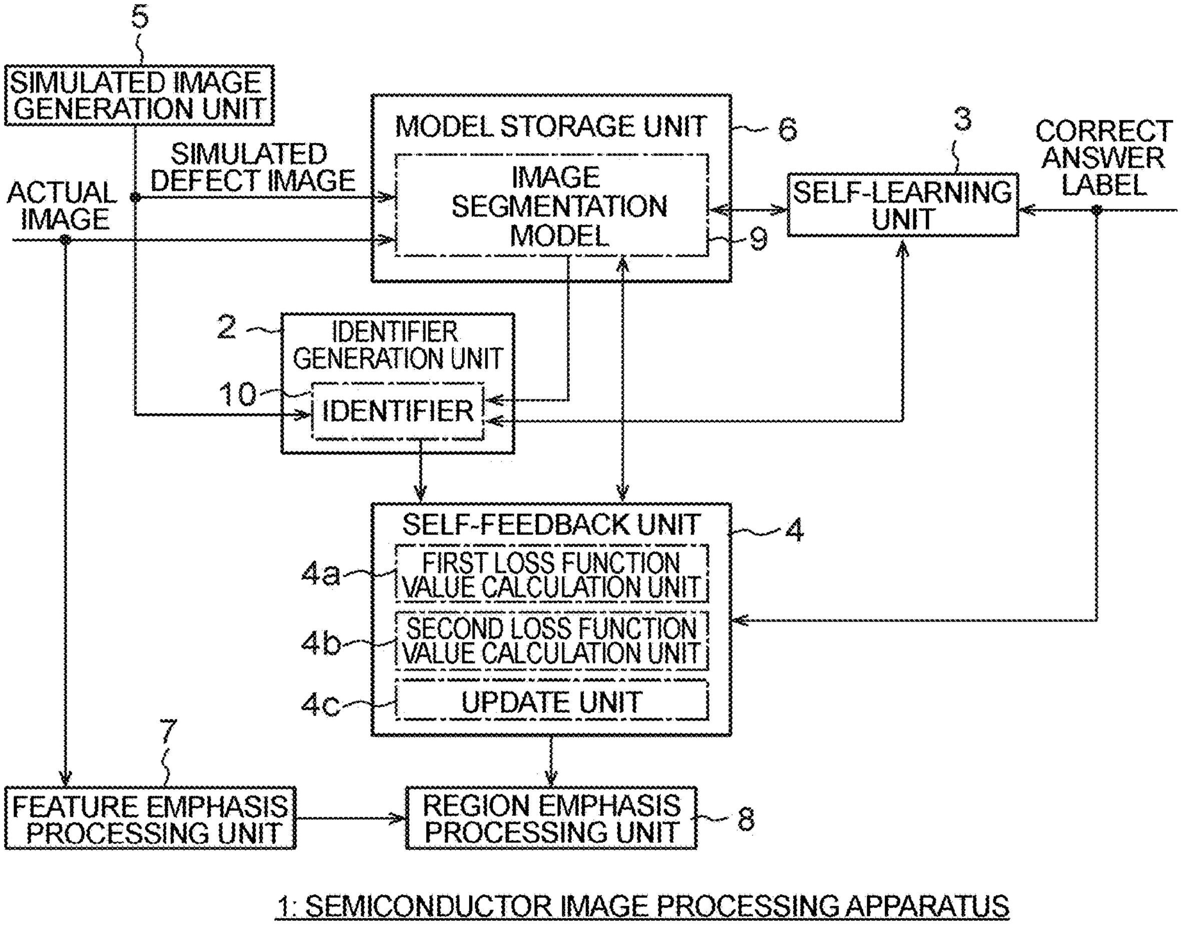
FIG. 1 is a block diagram illustrating a schematic configuration of a semiconductor image processing apparatus according to a first embodiment.

FIG. 1 is a block diagram illustrating a schematic configuration of a semiconductor image processing apparatus 1 according to a first embodiment. The semiconductor image processing apparatus 1 according to the first embodiment includes an identifier generation unit 2, a self-learning unit 3, a self-feedback unit 4, a simulated image generation unit 5, a model storage unit 6, a feature emphasis processing unit 7, and a region emphasis processing unit 8. In FIG. 1, an identifier 10 generated by the identifier generation unit 2, the self-learning unit 3, the self-feedback unit 4, and a model 9 stored in the model storage unit 6 are essential constituent units of the semiconductor image processing apparatus 1 according to the first embodiment, and others are optional constituent units that can be added as necessary.

The identifier generation unit 2 generates an identifier 10. The identifier 10 identifies a label corresponding to a feature amount included in an input image. The input image includes, for example, a simulated image generated by the simulated image generation unit 5 and a real image obtained by real capturing. The input image is a simulated image or a real image of any object, and the object is not limited to a specific object. An example in which the object is a semiconductor wafer and the input image is a simulated defect image or a real image of the surface of a semiconductor wafer will be mainly described below.

The feature amount refers to a characteristic form included in the input image. As a specific example, the feature amount is a defect included in the simulated defect image or the real image which is the input image. As will be described later, the defect includes a plurality of types in which at least one of a shape, a size, a number, a color, luminance, and the like is different.

The label is a partial image including the feature amount in the simulated defect image or the real image. In this specification, a separate label is allocated for each type of feature amount. In this specification, a label that is allocated in advance to a specific feature amount of an input image is referred to as a true answer label.

The identifier 10 includes, for example, a neural network capable of machine learning. When an input image is input to the neural network, a label corresponding to the input image is output from the neural network. As described above, the identifier 10 identifies and outputs the label included in the input image.

The self-learning unit 3 learns the model 9 for inferring the feature amount included in the input image and learns the identifier 10. More specifically, the self-learning unit 3 learns the model 9 by inputting the simulated defect image having a known true answer label to the model 9 so that the model 9 outputs an inference image of the true answer label. In addition, the self-learning unit 3 learns the identifier 10 by inputting the inference image output from the model 9 to the identifier 10 so that the identifier 10 outputs the true answer label.

The model 9 performs segmentation to classify the input image according to the feature amount included in the input image, and outputs a different inference image for each type of the feature amount. In this specification, the model 9 may be referred to as an image segmentation model 9. The image segmentation model 9 includes, for example, a neural network capable of machine learning. By inputting an input image to the neural network, an inference image corresponding to a feature amount included in the input image is output. In this specification, the self-learning unit 3 may be referred to as a first learning unit. As described above, when the self-learning unit 3 learns the image segmentation model 9, the simulated defect image having the known true answer label is input to the image segmentation model 9.

The self-feedback unit 4 additionally learns the image segmentation model 9 based on the input image and the learned identifier 10. The self-feedback unit 4 uses both the simulated defect image and the real image as input images to the image segmentation model 9. In this specification, the self-feedback unit 4 may be referred to as a second learning unit.

The self-feedback unit 4 includes a first loss function calculation unit 4*a*, a second loss function calculation unit 4*b*, and an update unit 4*c*. The first loss function calculation unit 4*a* calculates a first loss function value based on a label corresponding to a first inference image inferred by inputting the simulated image to the model 9 and the true answer label of the simulated image. The second loss function calculation unit 4*b* calculates a second loss function value based on a label predicted by inputting, to the identifier 10, a second inference image inferred by inputting a real image to the model 9. The update unit 4*c* updates the parameter of the model 9 based on a third loss function value obtained by adding the first loss function value and the second loss function value. Details of the processing of the self-feedback unit 4 will be described later.

The simulated image generation unit 5 generates a simulated image. In this specification, an example in which the simulated image generation unit 5 generates a simulated defect image including a simulated defect will be mainly described. As will be described later, the simulated image generation unit 5 generates a simulated defect image by combining a background pattern image and the defect pattern image.

The model storage unit 6 stores the image segmentation model 9 that is being learned and has been learned.

The feature emphasis processing unit 7 generates a background difference image obtained by removing a background pattern from a real image. The region emphasis processing unit 8 extracts a region including a feature amount included in the real image, and performs image processing on the background difference image according to each region to generate a feature emphasis-processed image. For example, the feature emphasis-processed image is an image in which at least one of the color or the luminance of the corresponding pixel region is emphasized for each type of defect.

Figure 2:
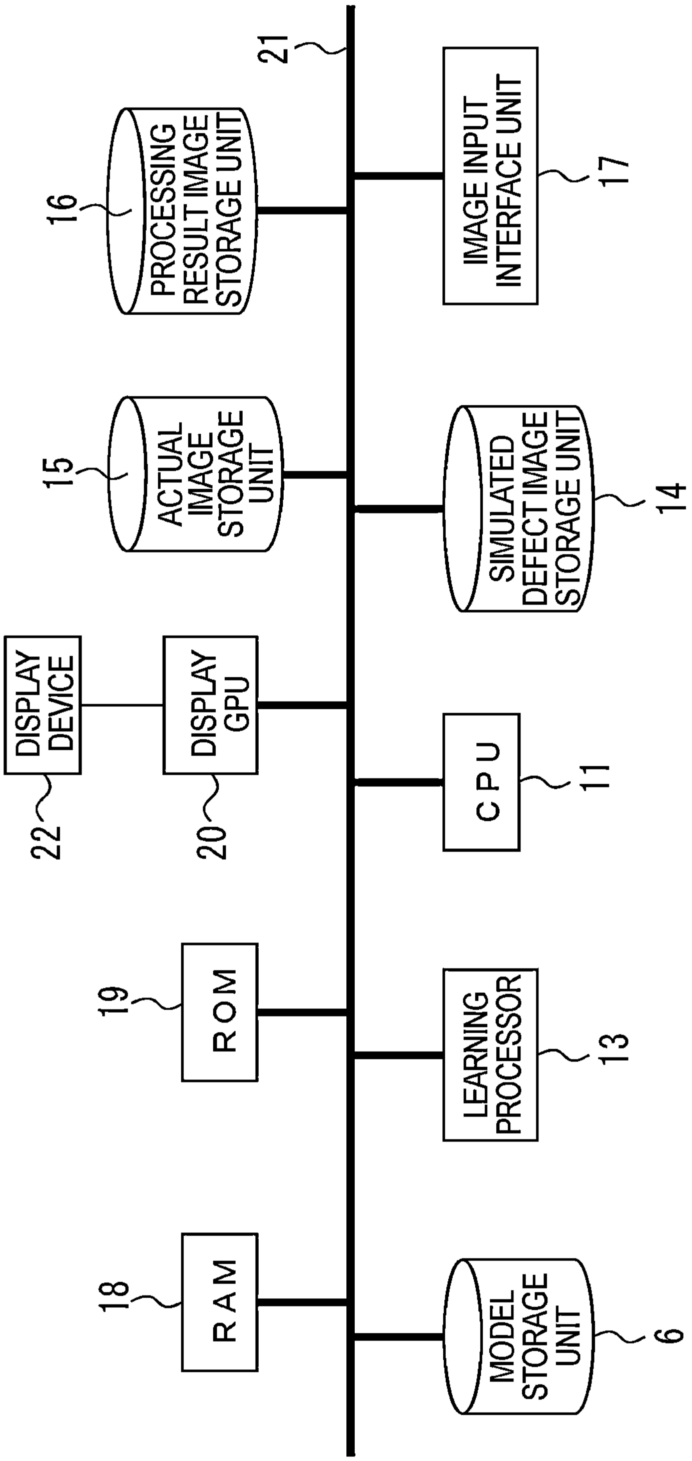
FIG. 2 is a block diagram illustrating a hardware configuration of the semiconductor image processing apparatus according to the first embodiment.

FIG. 2 is a block diagram illustrating a hardware configuration of the semiconductor image processing apparatus 1 according to the first embodiment. The semiconductor image processing apparatus 1 in FIG. 2 has a configuration in which a CPU 11, the model storage unit 6, a learning processor 13, a simulated defect image storage unit 14, a real image storage unit 15, a processing result image storage unit 16, an image input interface unit 17, a RAM 18, a ROM 19, and a display GPU 20 are connected to a common bus 21. A display device 22 is connected to the display GPU 20.

The CPU 11 performs overall control of the semiconductor image processing apparatus 1 by reading and executing a program from the ROM 19. At this time, the CPU 11 uses the RAM 18 as a work memory. The learning processor 13 mainly performs processing of the identifier generation unit 2, the self-learning unit 3, and the self-feedback unit 4 under the instruction of the CPU 11. The learning processor 13 may be omitted, and the CPU 11 may perform the processing of the identifier generation unit 2, the self-learning unit 3, and the self-feedback unit 4.

The model storage unit 6 stores the parameters and the like of the image segmentation model 9 that is learned by the self-learning unit 3 and is additionally learned by the self-feedback unit 4. The parameters are a layer configuration of a neural network constituting the image segmentation model 9, weight information between nodes of each layer, and the like. The model storage unit 6 may be a partial storage region of the RAM 18.

The simulated defect image storage unit 14 stores the simulated defect image generated by the simulated image generation unit 5 in FIG. 1. The real image storage unit 15 stores the real image input via the image input interface unit 17. The processing result image storage unit 16 stores the feature emphasis-processed image. The display GPU 20 performs control to display the simulated defect image, the real image, the label, the feature emphasis-processed image, and the like on the display device 22 as necessary under the instruction of the CPU 11.

Figure 3:
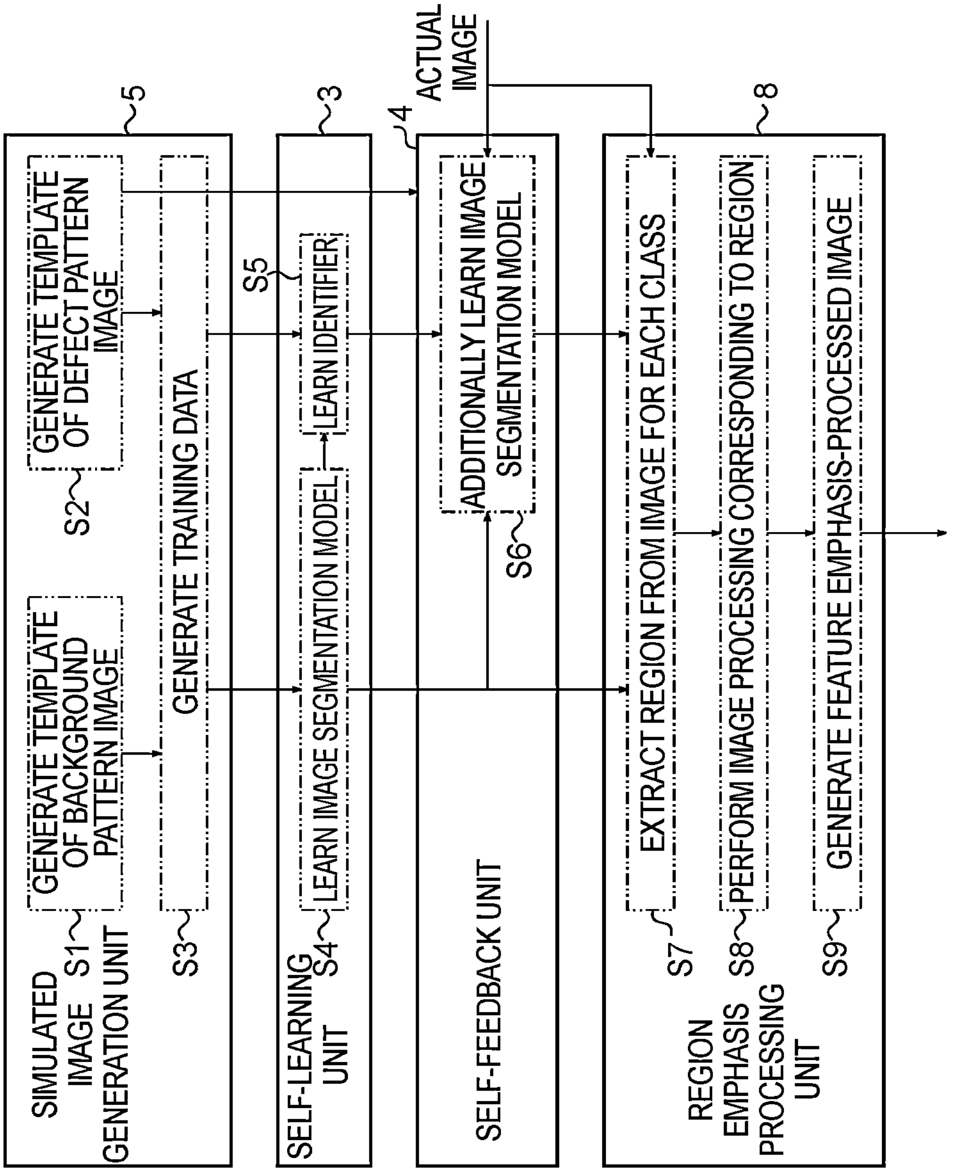
FIG. 3 is a sequence diagram illustrating a flow of processing of each unit in the semiconductor image processing apparatus according to the first embodiment.

FIG. 3 is a sequence diagram illustrating a flow of processing of each unit in the semiconductor image processing apparatus 1 according to the first embodiment.

The simulated image generation unit 5 generates a template of a background pattern image (S1) and generates a template of a defect pattern image (S2). The templates may be generated in advance and stored in the simulated defect image storage unit 14. The simulated image generation unit 5 may acquire any background pattern image and any defect pattern image from the simulated defect image storage unit 14.

Then, the simulated image generation unit 5 generates training data in which a simulated defect image obtained by freely combining the background pattern image and the defect pattern image and a corresponding true answer label are combined (S3).

Then, the self-learning unit 3 learns the image segmentation model 9 (S4) and learns the identifier 10 (S5). As described above, the self-learning unit 3 first learns the image segmentation model 9, and learns the identifier 10 after learning of the image segmentation model 9 is completed. Alternatively, the self-learning unit 3 may perform learning of the image segmentation model 9 and learning of the identifier 10 in parallel.

Then, the self-feedback unit 4 performs additional learning of the image segmentation model 9 by using the image segmentation model 9, the learned identifier 10, the simulated defect image, and the real image (S6).

Then, the region emphasis processing unit 8 extracts a region for each class according to the feature amount included in the real image based on the label output from the image segmentation model 9 by inputting the real image to the learned image segmentation model 9 (S7), performs image processing according to the region (S8), and generates a feature emphasis-processed image (S9). The class is identification information classified by individual feature amounts.

Next, the processing operation of each unit illustrated in FIG. 1 will be sequentially described in detail.

Figure 4:
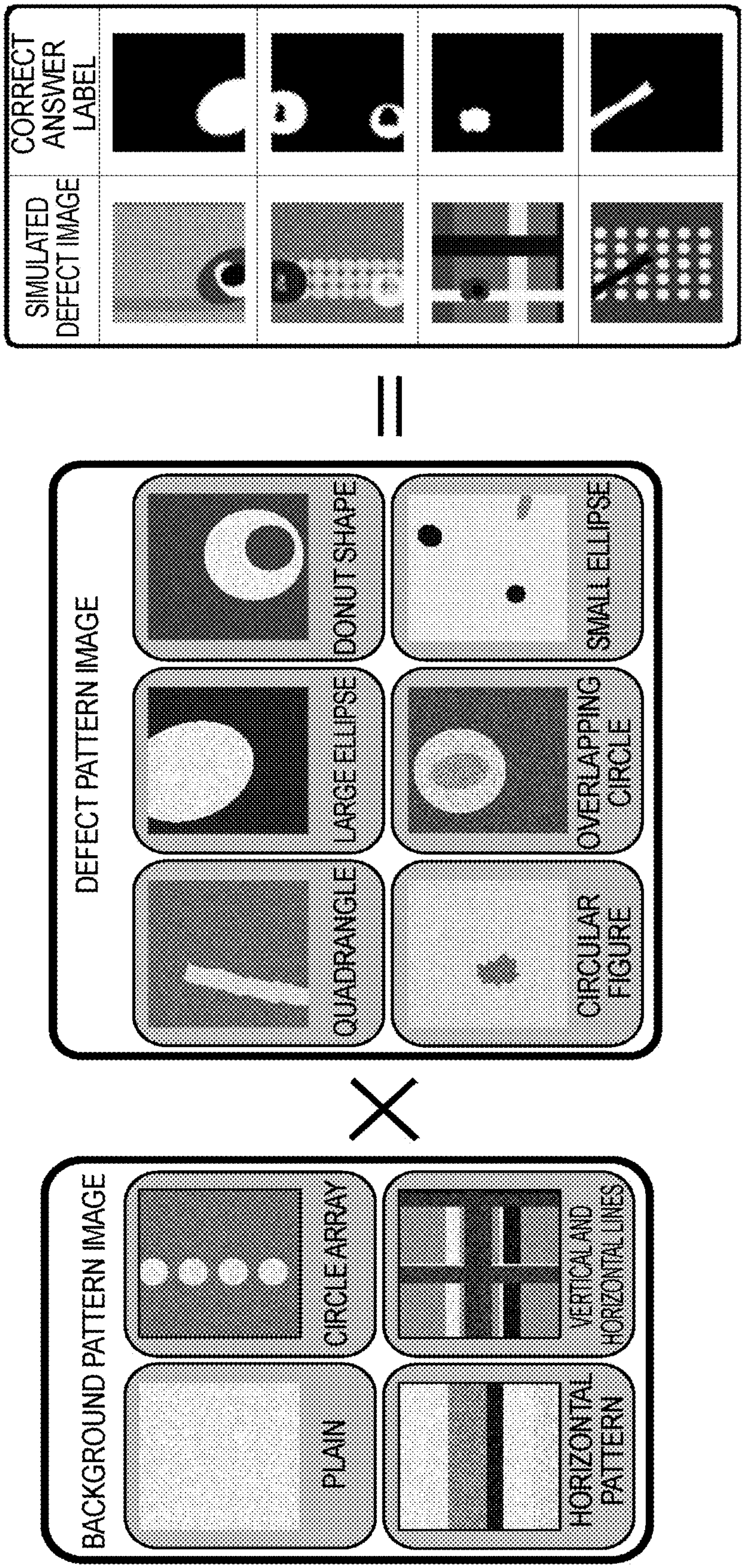
FIG. 4 is a diagram illustrating processing of a simulated image generation unit.
Figure 5:
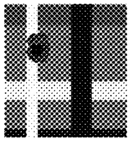
FIG. 5 is a diagram summarizing features of defect patterns.
Figure 5:
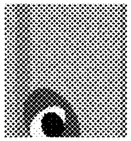
Figure 6:
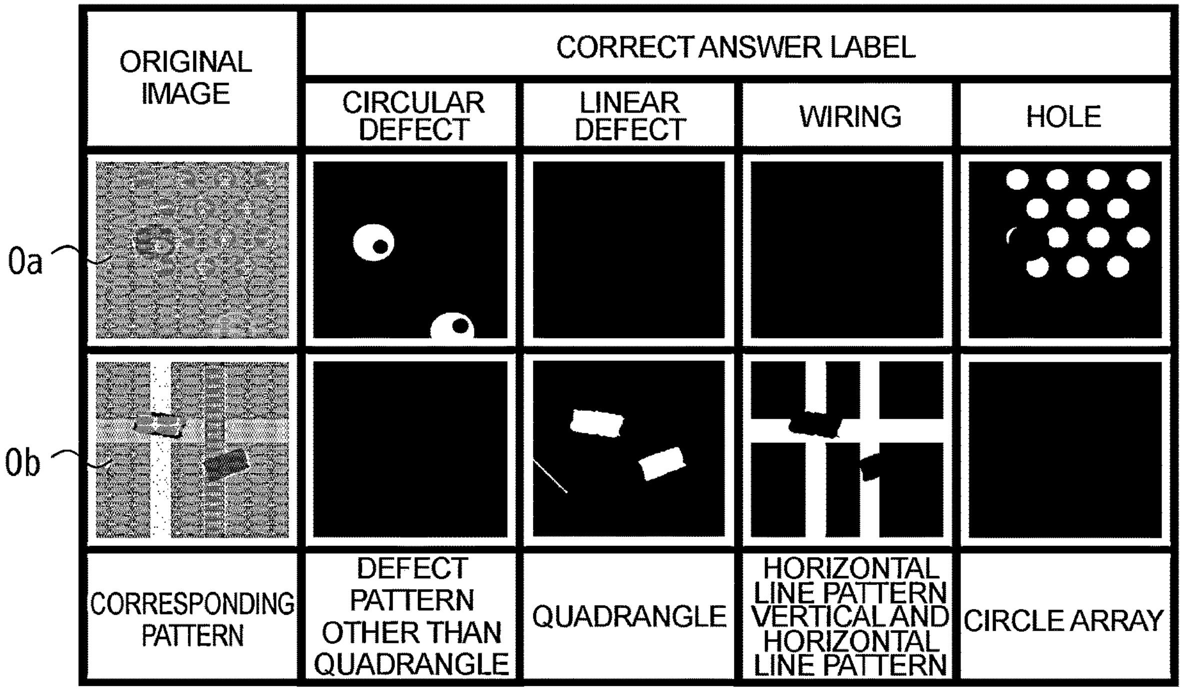
FIG. 6 is a diagram illustrating a specific example of a true answer label.

FIGS. 4, 5, and 6 are diagrams illustrating processing of the simulated image generation unit 5. As illustrated in FIG. 4, the simulated image generation unit 5 generates a simulated defect image by freely selecting and combining one of background pattern images and one of defect pattern images, and generates a true answer label included in the simulated defect image. The background pattern image and the defect pattern image illustrated in FIG. 4 are just specific examples, and the background pattern image and the defect pattern image are not limited thereto.

FIG. 5 is a diagram summarizing features of the defect pattern image. As illustrated in FIG. 5, the defect pattern image is generated based on the pattern, the length, the color, and the position of a defect pattern. Among the pattern, the length, the color, and the position, the pattern is specified by selecting one from a plurality of options. Each of the length, the color, and the position is specified by randomly selecting one from a plurality of options. As described above, the simulated image generation unit 5 specifies the pattern of the defect pattern, and randomly selects each of the length, the color, and the position of the defect pattern to generate the defect pattern image. Therefore, it is possible to randomly generate various types of defect pattern images having different shapes.

FIG. 5 illustrates an example of generating two different defect pattern images Da and Db. The defect patterns included in the defect pattern images Da and Db have different patterns, and also have different lengths, colors, and positions. As described above, by randomly selecting the length, color, and position of the defect pattern, it is possible to generate many kinds of simulated defect images.

FIG. 6 is a diagram illustrating specific examples of original images Oa and Ob of defect portions included in a real image and true answer labels corresponding to the defect portions included in the original images Oa and Ob. The real image includes defects of various shapes, sizes, colors, and luminances. A plurality of types of defects may overlap each other. The original image Oa in FIG. 6 shows an example including circular defects and hole defects. The original image Ob shows an example including a linear defect and a wiring defect.

The simulated image generation unit 5 classifies defects included in the original image and generates a true answer label in a monochrome image. FIG. 6 shows an example in which the true answer label includes a circular defect, a linear defect, a wiring defect, and a hole defect, but this is merely an example.

Figure 7:
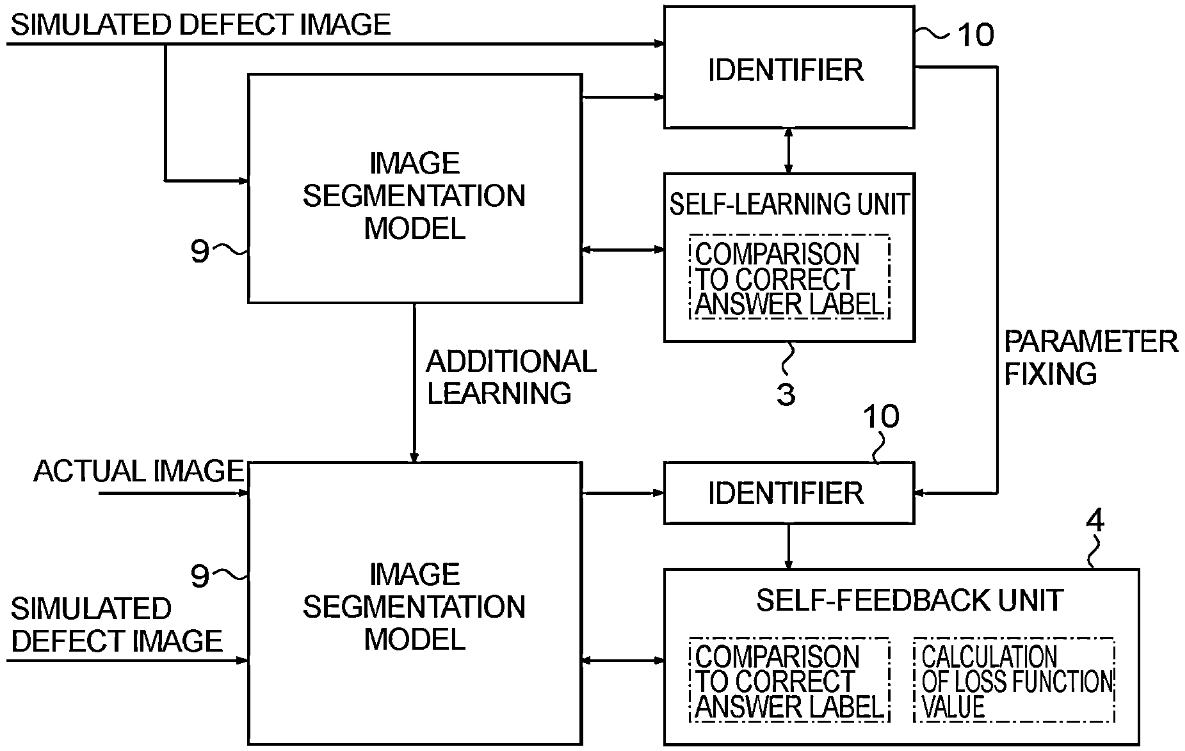
FIG. 7 is a diagram illustrating processing of a self-learning unit and a self-feedback unit.

FIG. 7 is a diagram illustrating processing of the self-learning unit 3 and the self-feedback unit 4. As illustrated in FIG. 7, the self-learning unit 3 learns the image segmentation model 9 and the identifier 10 by using the simulated defect image and the true answer label. The self-feedback unit 4 performs additional learning of the image segmentation model 9 by using the simulated defect image and the real image.

Figure 8:
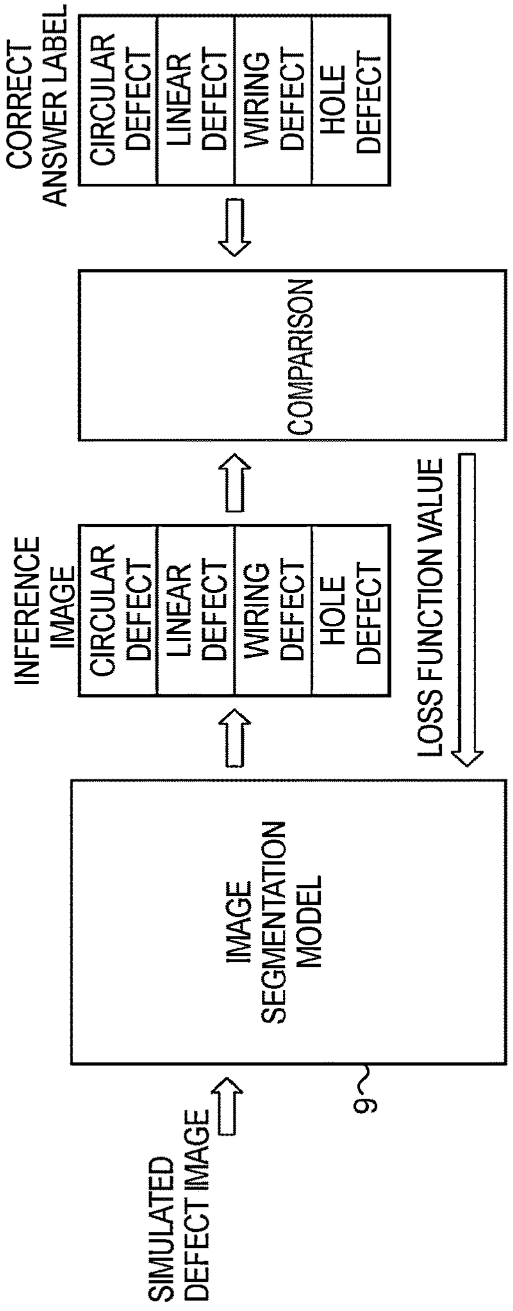
FIG. 8 is a diagram illustrating details of learning processing of an image segmentation model by the self-learning unit.

FIG. 8 is a diagram illustrating details of learning processing of the image segmentation model 9 by the self-learning unit 3. The simulated defect image generated by the simulated image generation unit 5 and the true answer label are input to the self-learning unit 3. The self-learning unit 3 inputs the simulated defect image to the image segmentation model 9. The image segmentation model 9 infers a defect included in the input simulated defect image and outputs an inference image including the defect. FIG. 8 illustrates an example in which the inference image includes, for example, at least one of a circular defect, a linear defect, a wiring defect, or a hole defect.

The self-learning unit 3 compares the inference image output from the image segmentation model 9 to the true answer label for each pixel, and inputs, to the image segmentation model 9, a comparison result between the inference image and the true answer label for each pixel as a loss function value. The self-learning unit 3 updates the parameter of the image segmentation model 9 based on the loss function value.

Figure 9:
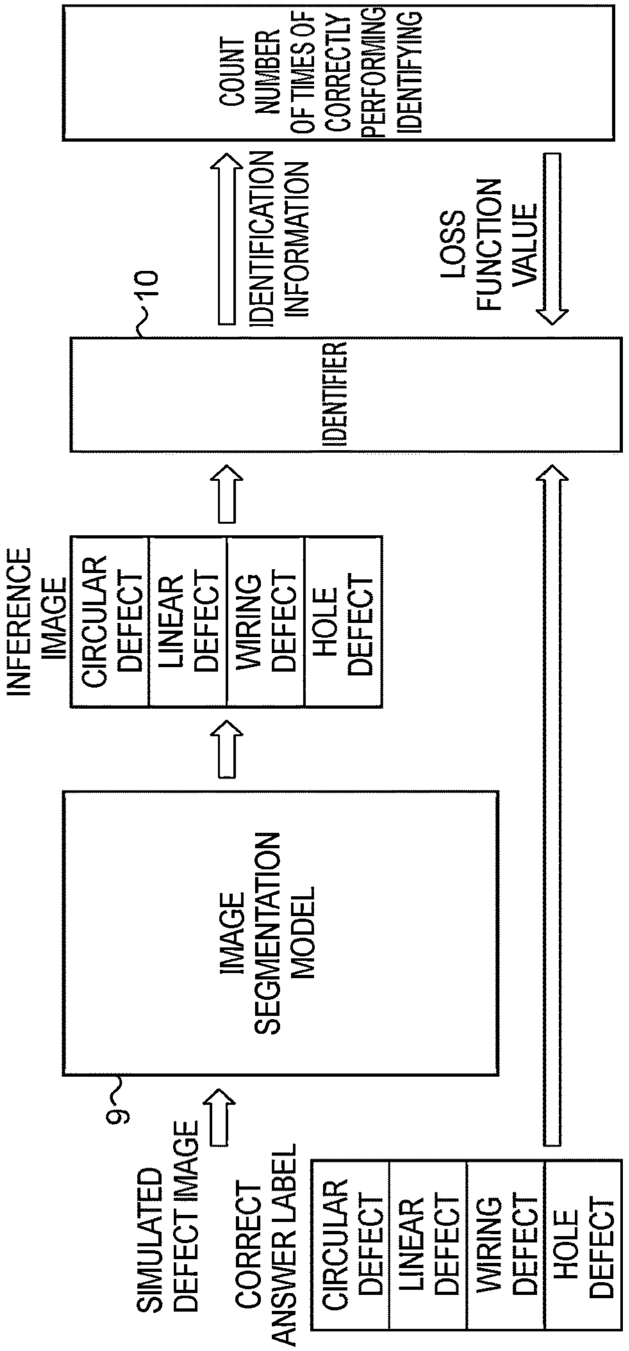
FIG. 9 is a diagram illustrating details of learning processing of an identifier by the self-learning unit.

FIG. 9 is a diagram illustrating details of learning processing of the identifier 10 by the self-learning unit 3. After learning of the image segmentation model 9 has been completed, the self-learning unit 3 learns the identifier 10 by inputting the inference image output from the image segmentation model 9 to the identifier 10 so that the inference image can be correctly identified as the true answer label. More specifically, as illustrated in FIG. 9, the identifier 10 repeatedly executes a process of outputting identification information indicating whether or not the input inference image is the true answer label, and the number of times of being correctly identified is input to the identifier 10 as the loss function value, and thus the identifier 10 is learned. The identifier 10 is learned such that the identifier 10 can correctly identify whether or not the inference image is the true answer label not for each pixel but from the entirety of the inference image.

Figure 10:
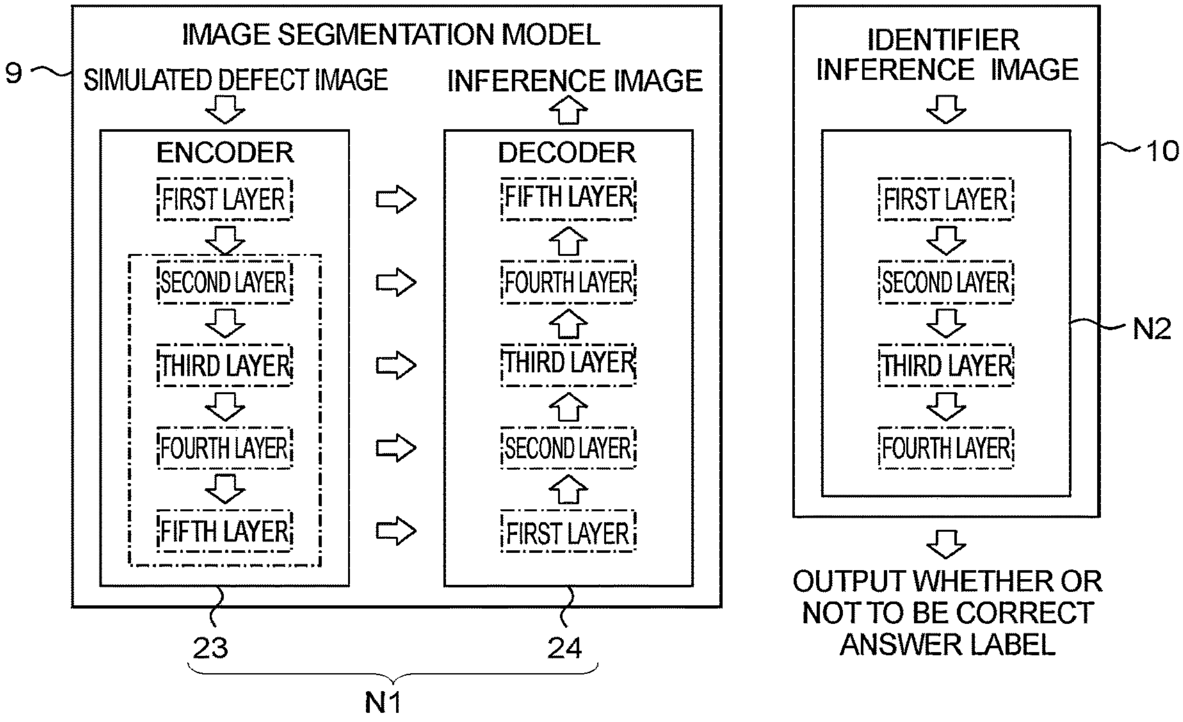
FIG. 10 is a diagram illustrating an example of a neural network of the image segmentation model and a neural network of the identifier.

The image segmentation model 9 and the identifier 10 each perform learning by using the neural network. FIG. 10 is a diagram illustrating an example of a neural network N1 of the image segmentation model 9 and a neural network N2 of the identifier 10. The neural networks N1 and N2 of the image segmentation model 9 and the identifier 10 have any configuration, and are not limited to the network configuration illustrated in FIG. 10.

The neural network N1 of the image segmentation model 9 illustrated in FIG. 10 includes an encoder 23 and a decoder 24. The encoder 23 includes, for example, processing layers of a first layer to a fifth layer. Every time the encoder 23 passes through each layer, dimensions are compressed and channels are increased in stages. The channel is a unit expressing different feature amounts. For example, in a case where three primary colors of light are used as a reference of the feature amount, each color of red, green, and blue, which are the three primary colors of light, corresponds to the channel. The simulated defect image is input to the first layer of the encoder 23, and an output of the fifth layer of the encoder 23 is input to the first layer of the decoder 24. The decoder 24 includes, for example, processing layers of a first layer to a fifth layer. Every time the decoder 24 passes through each layer, the dimension is extended. Each processing layer of the encoder 23 and each processing layer of the decoder 24 are associated with each other, and the processing layers in the same stage have the same dimensional compression ratio and channel. The inference image is output from the fifth layer of the decoder 24.

The neural network N2 of the identifier 10 illustrated in FIG. 10 includes, for example, processing layers (first to fourth layers) having the same configuration as the second to the fifth layers indicated by broken line frames of the encoder 23 of the image segmentation model 9. The inference image output from the image segmentation model 9 is input to the first layer of the neural network of the identifier 10. The dimensions are compressed each time passing through each layer, and information indicating the inference image or the true answer label is finally output.

Figure 11:
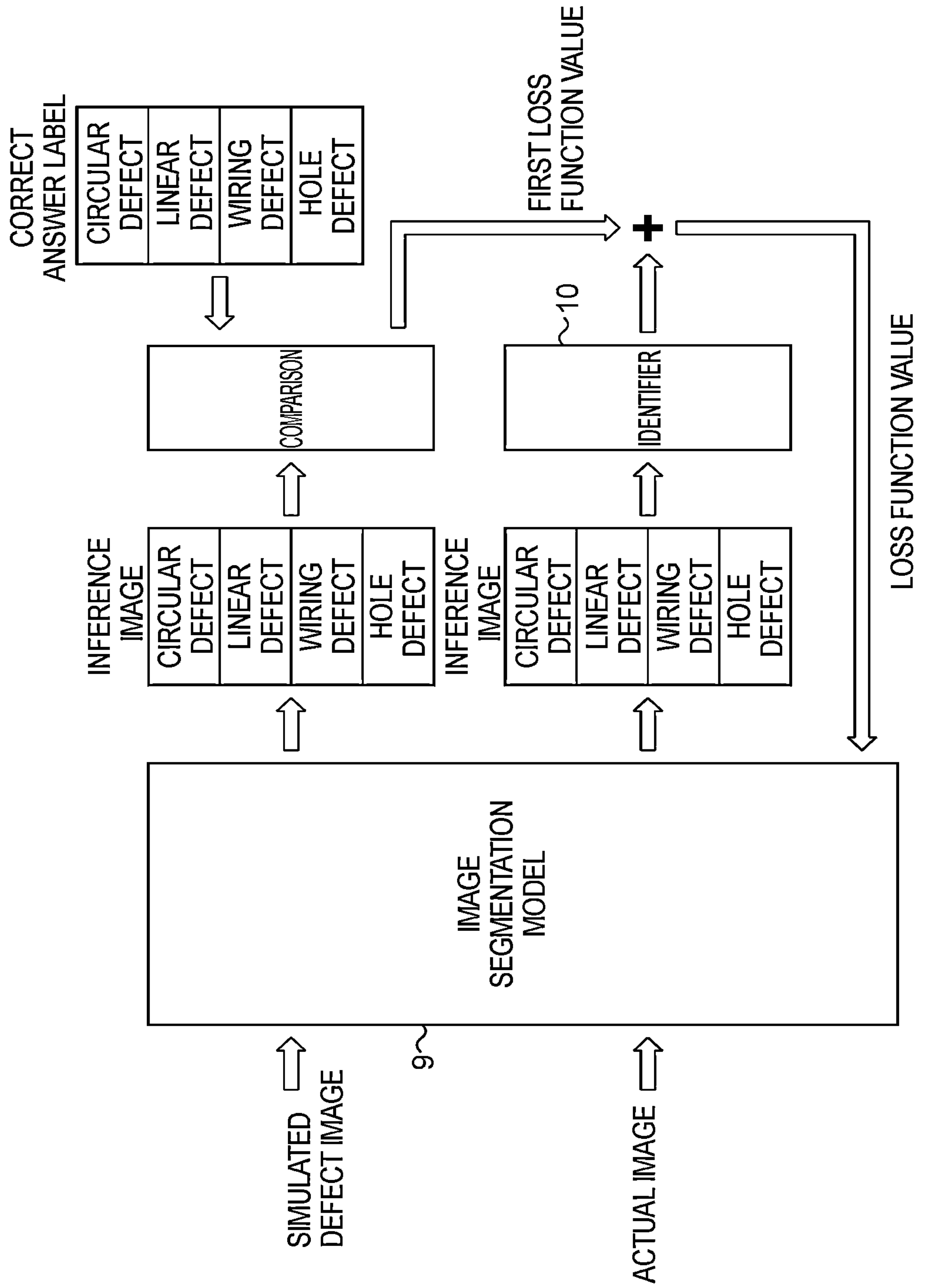
FIG. 11 is a diagram illustrating processing of the self-feedback unit.
Figure 12:
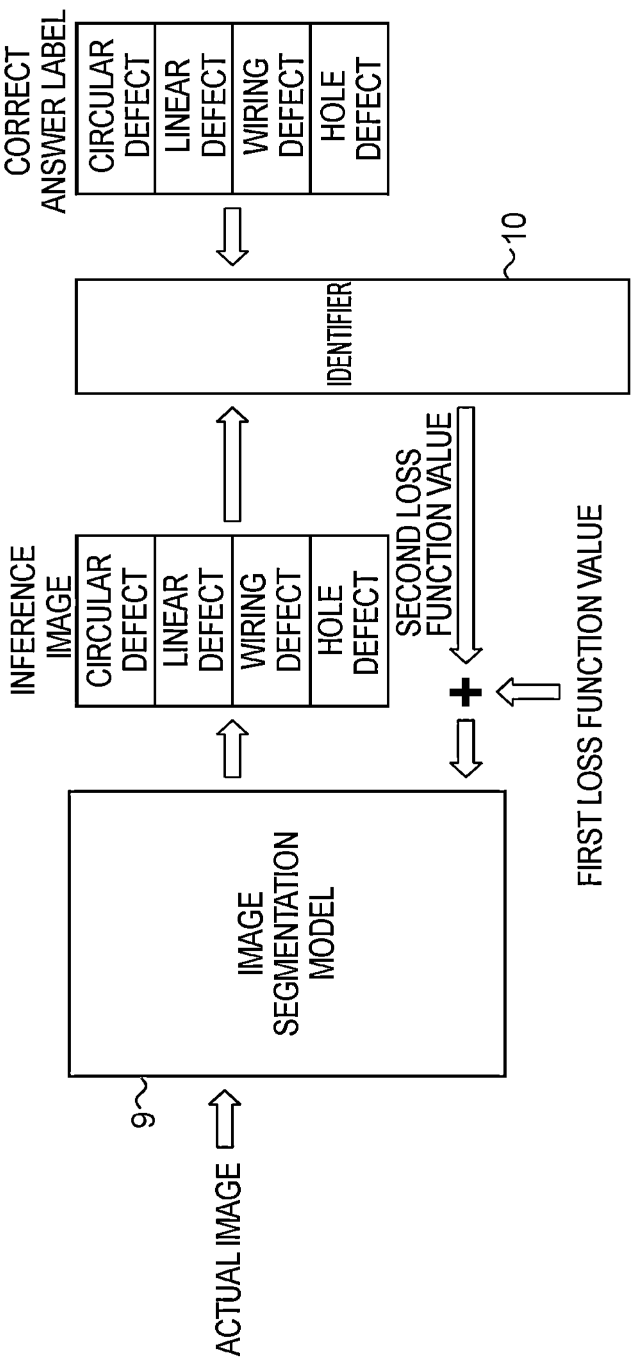
FIG. 12 is a diagram illustrating details of processing using a real image by the self-feedback unit.

FIGS. 11 and 12 are diagrams illustrating processing of the self-feedback unit 4. The self-feedback unit 4 additionally learns the image segmentation model 9 learned by the self-learning unit 3. For the additional learning of the image segmentation model 9, a simulated defect image having a known true answer label and a real image having an unknown true answer label are used. The real image is, for example, an image obtained by capturing the surface of the semiconductor wafer with a camera. The simulated defect image may be the same as or different from the simulated defect image used for learning in the self-learning unit 3. More specifically, an image set including a plurality of simulated defect images is used for learning by the self-learning unit 3 and additional learning by the self-feedback unit 4. The image set used for the learning by the self-learning unit 3 is desirably the same as the image set used for the additional learning by the self-feedback unit 4. In this case, simulated defect images in which at least a part of the same image set is different from each other may be used in the self-learning unit 3 and the self-feedback unit 4.

As illustrated in FIG. 11, when the simulated defect image is input to the image segmentation model 9, the image segmentation model 9 outputs an inference image of a defect included in the simulated defect image. Comparing whether or not the inference image coincides with the true answer label is performed for each pixel, and the comparison result is calculated as the first loss function value.

In addition, as illustrated in FIG. 11, when the real image is input to the image segmentation model 9, the image segmentation model 9 outputs an inference image of a defect included in the real image. This inference image is input to the identifier 10.

FIG. 12 is a diagram illustrating details of processing using the real image by the self-feedback unit 4. FIG. 12 illustrates an example in which the inference image includes, for example, a circular defect, a wiring defect, and a hole defect. The identifier 10 identifies whether or not the entirety of the inference image is a true answer label, and calculates the second loss function value based on the number of times that the identifier 10 correctly identifies the true answer label. The second loss function value Loss in this case is expressed by, for example, the following Expression (1). D indicates the identifier 10, t indicates an inference image, softmax indicates a softmax function, and Average indicates a function for obtaining an average value.

$$\text{Loss} = \text{Average}\ (\text{softmax}\ (D(t))) \tag{1}$$

As illustrated in FIGS. 11 and 12, the self-feedback unit 4 updates the parameter of the image segmentation model 9 based on a loss function value obtained by adding the first loss function value and the second loss function value.

Figure 13:
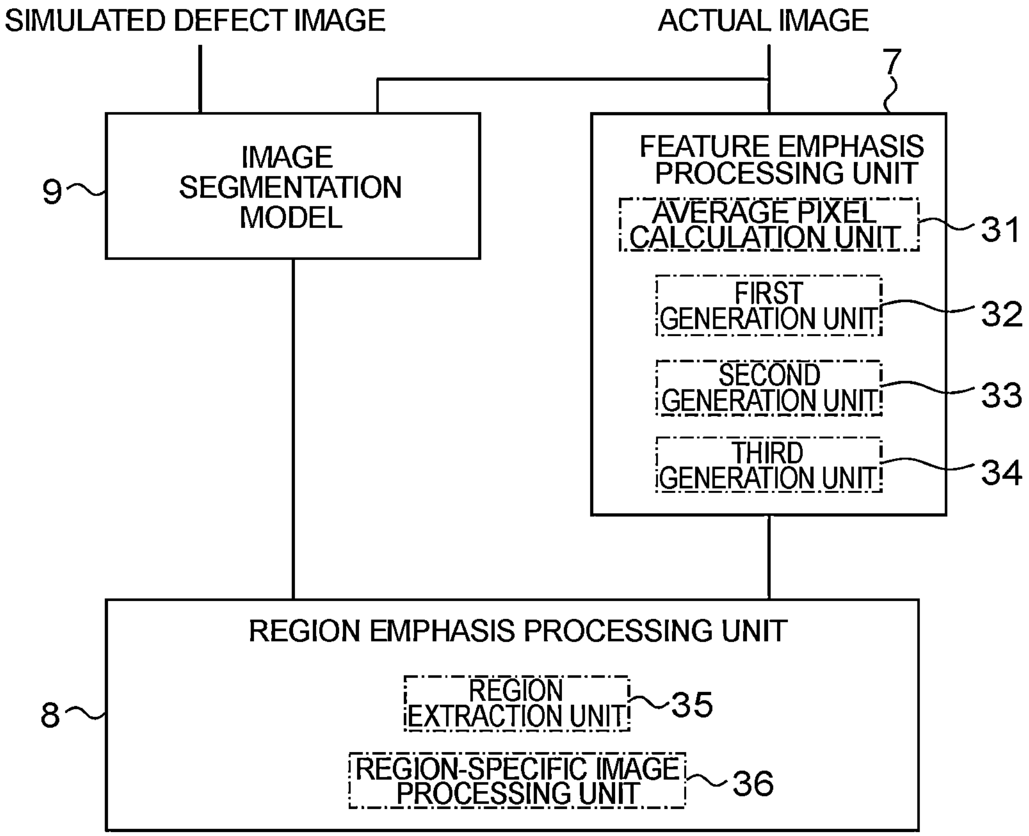
FIG. 13 is a detailed block diagram of a feature emphasis processing unit and a region emphasis processing unit.

FIG. 13 is a detailed block diagram of the feature emphasis processing unit 7 and the region emphasis processing unit 8.

The feature emphasis processing unit 7 generates a background difference image. The background difference image is an image obtained by removing the background pattern from the background image included in the real image.

The feature emphasis processing unit 7 includes an average pixel calculation unit 31, a first generation unit 32, a second generation unit 33, and a third generation unit 34.

The average pixel calculation unit 31 calculates an average pixel value for each first pixel region in a first direction of the input image.

The first generation unit 32 generates a first simulated background image based on the average pixel value for each first pixel region in the first direction of the input image. The input image is the real image and is the same as a real image input to the self-feedback unit 4.

The second generation unit 33 generates a second simulated background image based on a pixel value obtained by subtracting, for each pixel, the average pixel value of the input image from the pixel value obtained by adding, for each pixel, the average pixel value for each first pixel region in the first direction of the input image and the average pixel value for each second pixel region in a second direction intersecting the first direction of the input image.

The third generation unit 34 generates a background difference image of the input image by a difference between the input image and the first simulated background image or a difference between the input image and the second simulated background image. The third generation unit 34 can generate a background difference image from one input image.

The region emphasis processing unit 8 extracts a region including a feature amount included in the real image, and performs image processing according to the extracted region to generate a feature emphasis-processed image.

The region emphasis processing unit 8 includes a region extraction unit 35 and a region-specific image processing unit 36.

The region extraction unit 35 inputs the real image to the image segmentation model 9, and extracts a region for each class based on a result of classification for each type of defect included in the real image.

The region-specific image processing unit 36 generates the feature emphasis-processed image by performing image processing suitable for the background difference image generated by the feature emphasis processing unit 7 or performing image processing suitable for each region extracted by the region extraction unit 35.

Figure 14:
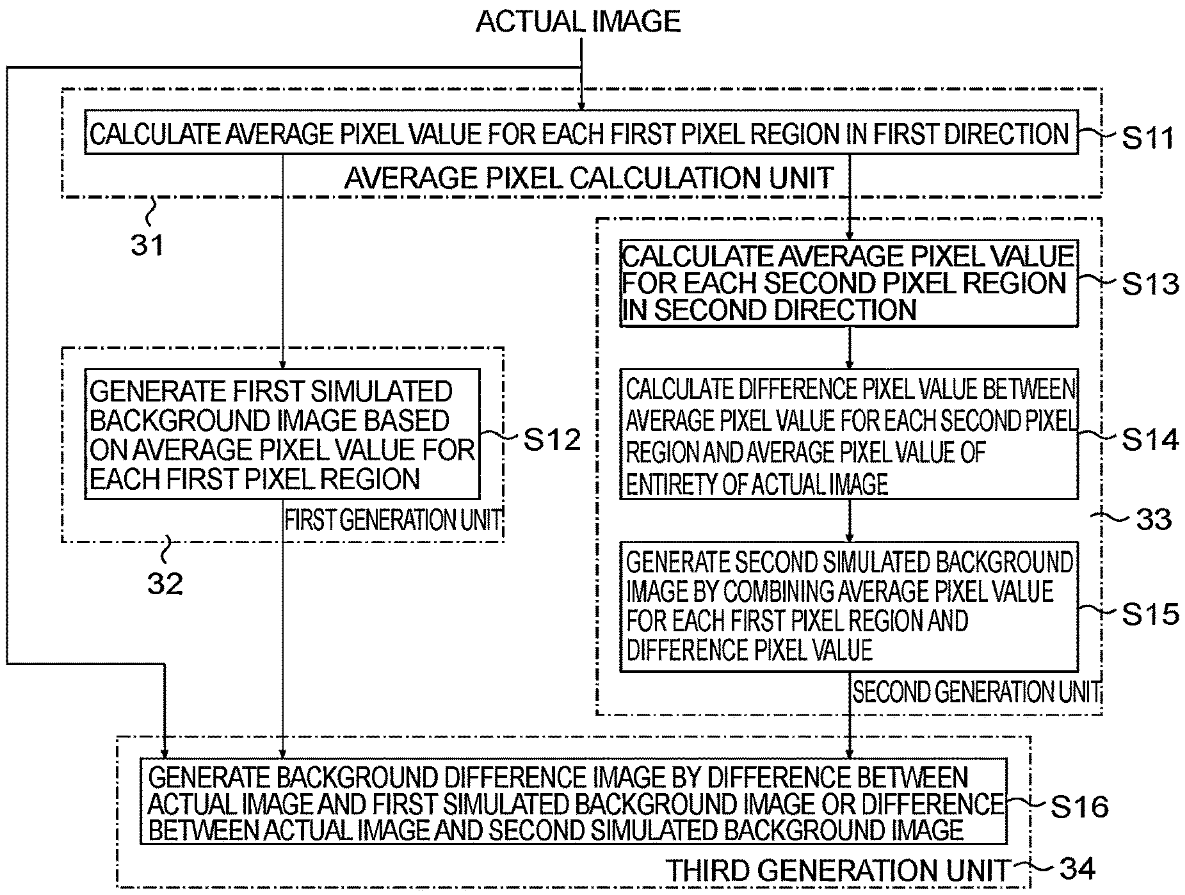
FIG. 14 is a flowchart illustrating a processing operation of the feature emphasis processing unit.
Figure 15:
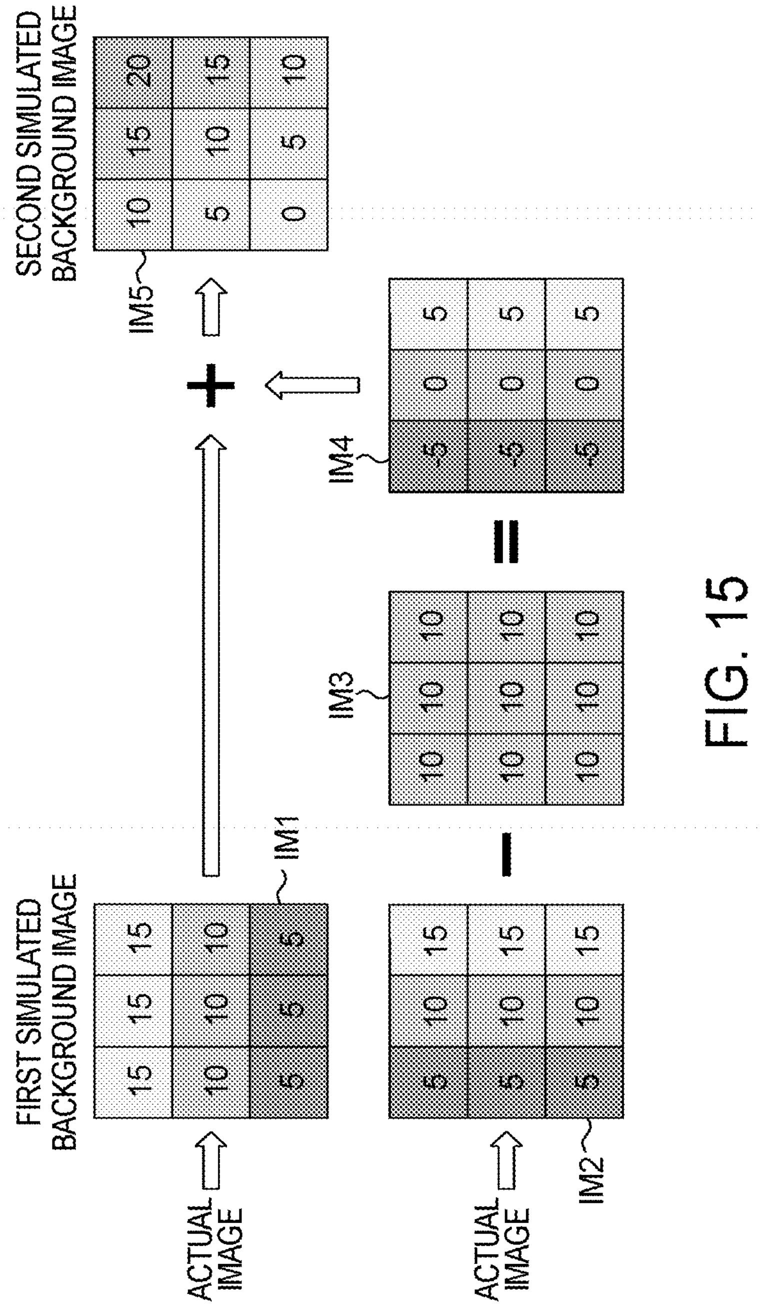
FIG. 15 is a diagram illustrating an example of an image generated while the feature emphasis processing unit performs processing.

FIG. 14 is a flowchart illustrating a processing operation of the feature emphasis processing unit 7. FIG. 15 is a diagram illustrating an example of the first simulated background image and the second simulated background image generated while the feature emphasis processing unit 7 is performing processing.

The average pixel calculation unit 31 of the feature emphasis processing unit 7 calculates an average pixel value for each first pixel region (for example, pixel row) in the first direction (for example, row direction) of the real image (S11).

Then, the first generation unit 32 generates a first simulated background image for all the first pixel regions (for example, pixel rows) of the real image based on the average pixel value for each of the first pixel regions (for example, pixel rows) (S12). As illustrated in FIG. 15, a first simulated background image IM1 has, for example, an average pixel value different for each pixel row, and has the same average pixel value in the same pixel row.

Then, before and after the first generation unit 32 executes the process of S12, the second generation unit 33 calculates an average pixel value for each second pixel region (for example, pixel column) in the second direction (for example, column direction) of the real image (S13). Subsequently, the second generation unit 33 calculates a difference pixel value between the average pixel value for all the second pixel regions (for example, pixel columns) of the input image and the average pixel value of the input image (S14). In S14, for example, as illustrated in FIG. 15, an image IM4 including a difference pixel value between an image IM2 and an image IM3 is generated. The image IM2 includes the average pixel value for each pixel column of the input image. The image IM3 includes the average pixel value of the input image.

Subsequently, the second generation unit 33 generates a second simulated background image (S15) by adding the average pixel value for each first pixel region in the first direction (for example, the row direction) of the input image and the difference pixel value calculated in S14. As illustrated in FIG. 15, a second simulated background image IM5 is obtained by adding the first simulated background image IM1 and the image IM4 including the difference pixel value.

Then, the third generation unit 34 generates a background difference image by a difference between the real image and the first simulated background image or a difference between the real image and the second simulated background image (S16).

When the background difference image is generated, it can be selected whether to generate a white residual image that makes a defect of a bright series (a white color series) conspicuous or to generate a black residual image that makes a defect of a dark series (a black color series) conspicuous, depending on whether the first or second simulated background image is subtracted from the real image or the real image is subtracted from the first or second simulated background image. The third generation unit 34 can generate at least one of the white residual image and the black residual image. As a result, it is possible to extract both of the defect of the bright series and the defect of the dark series.

As described above, in the first embodiment, the image segmentation model 9 and the identifier 10 are learned by inputting the simulated defect image having the known true answer label to the image segmentation model 9 and the identifier 10. Thereafter, the image segmentation model 9 is additionally learned by using the real image having an unknown true answer label and the simulated defect image having the known true answer label. As a result, it is possible to accurately distinguish and extract various defects included in the real image, and to generate a feature emphasis-processed image in which the display form is changed for each type of defect.

Second Embodiment

In a second embodiment, a real image is classified by a feature amount included in the real image.

Figure 16:
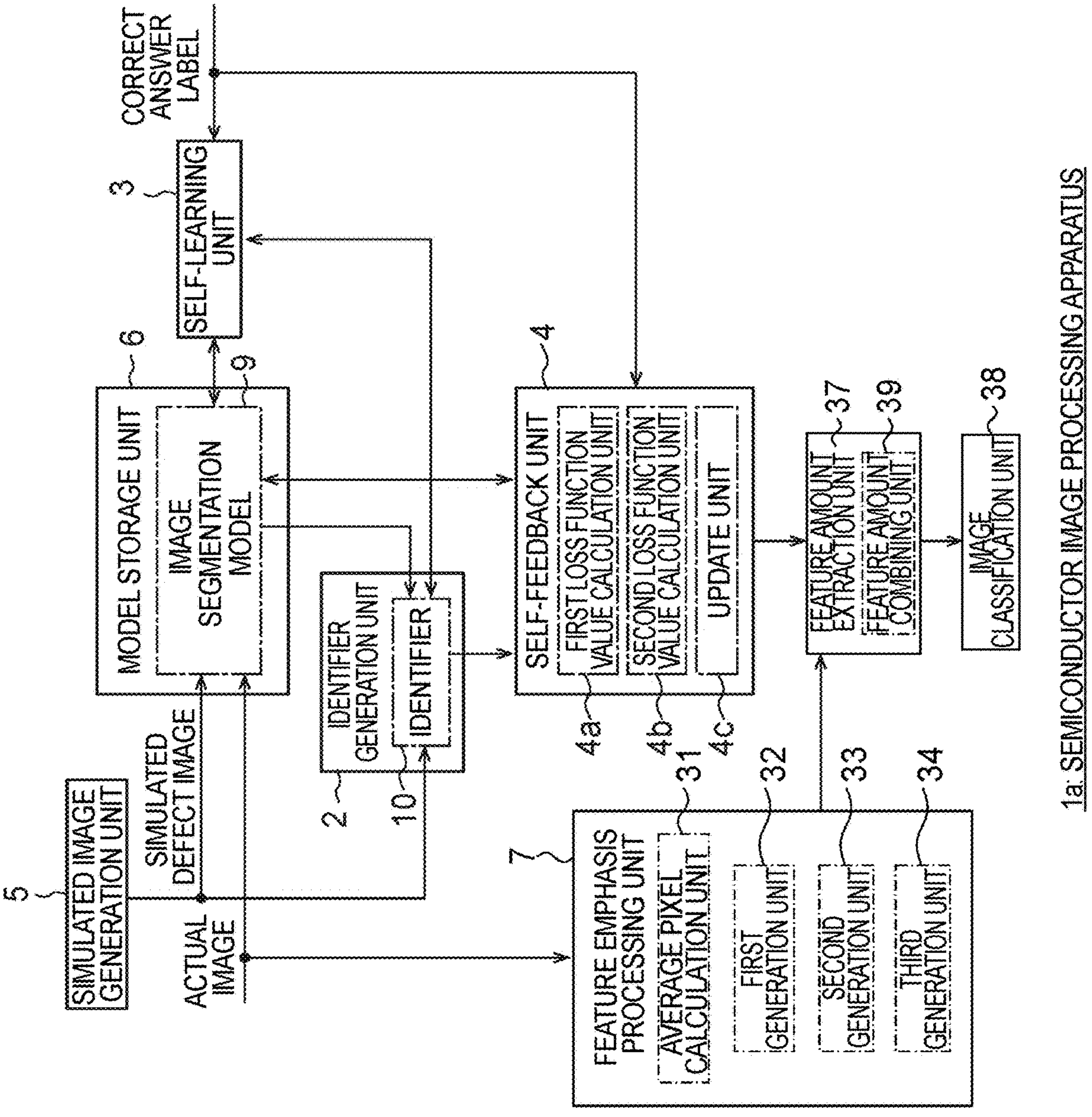
FIG. 16 is a block diagram illustrating a schematic configuration of a semiconductor image processing apparatus according to a second embodiment.

FIG. 16 is a block diagram illustrating a schematic configuration of a semiconductor image processing apparatus 1*a* according to a second embodiment. The semiconductor image processing apparatus 1*a* in FIG. 16 includes a self-learning unit 3, a self-feedback unit 4, a feature emphasis processing unit 7, a feature amount extraction unit 37, and an image classification unit 38.

The self-learning unit 3 and the self-feedback unit 4 in the second embodiment perform processing similar to that of the self-learning unit 3 and the self-feedback unit 4 in the first embodiment. The example of extracting the defect included in the real image has been described in the first embodiment, but the feature amount in the second embodiment is not necessarily limited to the defect.

Similarly to the feature emphasis processing unit 7 according to the first embodiment, the feature emphasis processing unit 7 according to the second embodiment includes an average pixel calculation unit 31, a first generation unit 32, a second generation unit 33, and a third generation unit 34. The feature emphasis processing unit 7 generates a background difference image from one input image. The feature emphasis processing unit 7 can generate a background difference image including a first background difference image for emphasizing a feature amount of a bright series (a white color series) and a second background difference image for emphasizing a feature amount of a dark series (a black color series).

The feature amount extraction unit 37 extracts the feature amount from a feature emphasis-processed image generated by performing image processing according to a region including the feature amount extracted by the additionally learned model 9 and a region including the feature amount included in the background difference image.

The feature amount extraction unit 37 includes a feature amount combining unit 39 that combines the feature amount included in an input image and the feature amount extracted by the feature amount extraction unit 37.

The image classification unit 38 performs clustering of the real images based on the feature amount combined by the feature amount combining unit 39.

As described above, in the second embodiment, by using the image segmentation model 9 and the identifier 10 similar to those in the first embodiment, the feature emphasis-processed image in which the feature amount included in the real image is emphasized for each type of feature amount can be generated, the feature amount extracted from the feature emphasis-processed image and the feature amount extracted from the real image can be combined, and clustering of the real image can be performed based on the combined feature amount. As a result, it is possible to classify the real image in consideration of various feature amounts.

At least a part of the semiconductor image processing apparatuses 1 and 1*a* described in the above-described embodiments may be configured by hardware or software. In a case of being configured by software, a program for realizing the function of at least a part of the semiconductor image processing apparatuses 1 and 1*a* may be stored in a recording medium such as a flexible disk or a CD-ROM, and may be read and executed by a computer. The recording medium is not limited to a removable recording medium such as a magnetic disk or an optical disk, and may be a fixed recording medium such as a hard disk device or a memory.

In addition, the program for realizing the function of at least a part of the semiconductor image processing apparatuses 1 and 1*a* may be distributed via a communication line (including wireless communication) such as the Internet. Further, the program may be distributed via a wired line or a wireless line such as the Internet or by being stored in a recording medium, in an encrypted, modulated, or compressed state.

While certain embodiments have been described, these embodiments have been presented by way of example only, and are not intended to limit the scope of the disclosures. Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

The invention claimed is:

1. A semiconductor image processing apparatus comprising a processing circuitry, the processing circuitry configured to:

perform learning a model for inferring a feature amount included in an input image and learning an identifier identifying a label corresponding to the feature amount included in the input image on the basis of an output of the model; and perform additional learning of the model based on the input image and the learned identifier, wherein the input image includes a simulated image having a known true answer label or a real image having an unknown label, and the additional learning includes calculating a first loss function value based on a label corresponding to a first inference image inferred by inputting the simulated image to the model and the true answer label of the simulated image, calculating a second loss function value based on the label predicted by inputting a second inference image inferred by inputting the real image to the model to the identifier, and updating a parameter of the model based on a third loss function value obtained by adding the first loss function value and the second loss function value.

2. The semiconductor image processing apparatus according to claim 1, wherein the processing circuitry is configured to learn the model based on the true answer label and an inference image inferred by inputting the simulated image to the model, and learn the identifier based on a result of comparing the label identified by inputting the inference image to the identifier to the true answer label.

3. The semiconductor image processing apparatus according to claim 1, wherein the processing circuitry is configured to start to learn the identifier after the learning of the model is ended, or while learning the model.

4. The semiconductor image processing apparatus according to claim 1, wherein the model is configured to classify the input image for each region including the feature amount, and give the label that is different for each type of the feature amount.

5. The semiconductor image processing apparatus according to claim 1, wherein the first loss function value is calculated based on a result of comparing the first inference image with a pixel of an image of the true answer label for each pixel, and the second loss function value is calculated based on a determination result as to whether or not an entirety of the second inference image coincides with the image of the true answer label.

6. The semiconductor image processing apparatus according to claim 1, wherein the processing circuitry is further configured to:

extract a region including the feature amount included in the real image based on the additionally learned model, and perform image processing according to the extracted region to generate a feature emphasis-processed image.

7. The semiconductor image processing apparatus according to claim 1, wherein the input image is an image of a surface of a wafer on which a semiconductor device is formed, and the feature amount includes a defect of the semiconductor device.

8. The semiconductor image processing apparatus according to claim 7, wherein the defect of the semiconductor device includes at least one defect of a circular shape, a linear shape, a wiring, or a hole.

9. The semiconductor image processing apparatus according to claim 7, wherein the processing circuitry is further configured to:

specify a pattern of the defect, and randomly select each of a length, a color, and a position of the defect, generate a defect pattern image, and generate the simulated image by combining a background pattern image and the generated defect pattern image.

10. A semiconductor image processing apparatus comprising a processing circuitry, the processing circuitry configured to:

perform a learning a model for inferring a feature amount included in an input image and a learning an identifier identifying a label corresponding to the feature amount included in the input image on the basis of an output of the model; and perform an additional learning of the model based on the input image and the learned identifier, wherein the processing circuitry is further configured to:

generate a background difference image obtained by removing a background pattern from the input image;

calculate an average pixel value for each first pixel region in a first direction of an input image, generate a first simulated background image based on the average pixel value for each first pixel region in the first direction of the input image, generate a second simulated background image based on a pixel value obtained by subtracting, for each pixel, the average pixel value of the input image from a pixel value obtained by adding, for each pixel, the average pixel value for each first pixel region in the first direction of the input image and an average pixel value for each second pixel region in a second direction intersecting the first direction of the input image, and generate the background difference image of the input image by a difference between the input image and the first simulated background image or a difference between the input image and the second simulated background image, and generate a feature emphasis-processed image based on the feature amount included in the background difference image.

11. The semiconductor image processing apparatus according to claim 10, wherein the background difference image is generated from one input image.

12. The semiconductor image processing apparatus according to claim 10, wherein the background difference image is generated to include either a first background difference image for emphasizing the feature amount of a bright series or a second background difference image for emphasizing the feature amount of a dark series.

13. A semiconductor image processing method comprising:

performing learning a model for inferring a feature amount included in an input image and learning an identifier identifying a label corresponding to the feature amount included in the input image on the basis of an output of the model; and performing additional learning of the model based on the input image and the learned identifier, wherein the input image includes a simulated image having a known true answer label or a real image having an unknown label, and the additional learning includes calculating a first loss function value based on a label corresponding to a first inference image inferred by inputting the simulated image to the model and the true answer label of the simulated image, calculating a second loss function value based on the label predicted by inputting a second inference image inferred by inputting the real image to the model to the identifier, and updating a parameter of the model based on a third loss function value obtained by adding the first loss function value and the second loss function value.

14. The semiconductor image processing method according to claim 13, wherein the input image includes a simulated image having a known true answer label and a real image having an unknown label, and the semiconductor image processing method further comprises:

learning the model based on the true answer label and an inference image inferred by inputting the simulated image to the model; and learning the identifier based on a result of comparing the label identified by inputting the inference image to the identifier to the true answer label.

15. The semiconductor image processing method according to claim 13, further comprising:

generating a background difference image obtained by removing a background pattern from the input image;

extracting the feature amount from a feature emphasis-processed image generated by performing image processing according to a region including a feature amount extracted by the additionally learned model and a region including a feature amount included in the background difference image; and performing a clustering of the input image based on a feature amount included in the feature emphasis-processed image.

16. The semiconductor image processing apparatus according to claim 10, wherein the input image includes a real image having an unknown label, and the processing circuitry is further configured to:

generate a background difference image obtained by removing a background pattern from the real image.

17. The semiconductor image processing apparatus according to claim 16, wherein the processing circuitry is further configured to:

calculate an average pixel value for each first pixel region in a first direction of the real image, generate a first simulated background image based on the average pixel value for each first pixel region in the first direction of the real image, generate a second simulated background image based on a pixel value obtained by subtracting, for each pixel, the average pixel value of the real image from a pixel value obtained by adding, for each pixel, the average pixel value for each first pixel region in the first direction of the real image and an average pixel value for each second pixel region in a second direction intersecting the first direction of the real image, and generate the background difference image by a difference between the real image and the first simulated background image or a difference between the real image and the second simulated background image.

18. The semiconductor image processing apparatus according to claim 10, wherein the processing circuitry is configured to:

extract the feature amount from a feature emphasis-processed image generated by performing image processing according to a region including a feature amount extracted by the additionally learned model and a region including a feature amount included in the background difference image; and perform a clustering of the input image based on a feature amount included in the feature emphasis-processed image.

19. The semiconductor image processing apparatus according to claim 18, wherein the processing circuitry is further configured to:

combine the feature amount included in the input image and the feature amount extracted from the feature emphasis-processed image, and perform the clustering of the input image based on the extracted feature amount.

20. A semiconductor image processing method comprising:

performing a learning a model for inferring a feature amount included in an input image and a learning an identifier identifying a label corresponding to the feature amount included in the input image on the basis of an output of the model;

performing an additional learning of the model based on the input image and the learned identifier;

generating a background difference image obtained by removing a background pattern from the input image;

calculating an average pixel value for each first pixel region in a first direction of an input image, generating a first simulated background image based on the average pixel value for each first pixel region in the first direction of the input image, generating a second simulated background image based on a pixel value obtained by subtracting, for each pixel, the average pixel value of the input image from a pixel value obtained by adding, for each pixel, the average pixel value for each first pixel region in the first direction of the input image and an average pixel value for each second pixel region in a second direction intersecting the first direction of the input image, and generating the background difference image of the input image by a difference between the input image and the first simulated background image or a difference between the input image and the second simulated background image, and generating a feature emphasis-processed image based on the feature amount included in the background difference image.

* * * * *